United States Patent [19]

Hinckley, Jr.

[11] Patent Number: 6,049,302
[45] Date of Patent: Apr. 11, 2000

[54] PULSED DOPPLER RADAR SYSTEM WITH SMALL INTERMEDIATE FREQUENCY FILTERS

[75] Inventor: William L. Hinckley, Jr., Mission Viejo, Calif.

[73] Assignee: Boeing North American, Anaheim, Calif.

[21] Appl. No.: 09/305,232

[22] Filed: May 4, 1999

[51] Int. Cl.[7] .................................................. G01S 13/72
[52] U.S. Cl. ............................. 342/99; 342/101; 342/62; 342/97; 342/137; 342/162; 342/192; 342/194; 342/195
[58] Field of Search ................................ 342/62, 99, 90, 342/94, 95, 96, 97, 101, 159, 160, 161, 162, 137, 192, 194, 195

[56] References Cited

U.S. PATENT DOCUMENTS

| | | | |
|---|---|---|---|
| 3,831,174 | 8/1974 | King et al. | 342/90 |
| 3,858,208 | 12/1974 | Parke et al. | 342/88 |
| 3,903,525 | 9/1975 | Mullins et al. | 342/161 |
| 4,042,925 | 8/1977 | Albanese et al. | 342/132 |
| 4,104,631 | 8/1978 | Weigle et al. | 342/94 |
| 4,566,010 | 1/1986 | Collins | 342/372 |
| 4,622,552 | 11/1986 | Andrews et al. | 342/196 |
| 4,766,435 | 8/1988 | Wells | 342/82 |
| 4,914,441 | 4/1990 | Brookner | 342/161 |
| 4,980,690 | 12/1990 | Fiden | 342/62 |
| 5,440,311 | 8/1995 | Gallagher et al. | 342/132 |
| 5,473,332 | 12/1995 | James et al. | 342/159 |
| 5,539,408 | 7/1996 | Moreira et al. | 342/25 |
| 5,539,412 | 7/1996 | Mendelson | 342/192 |
| 5,594,451 | 1/1997 | Krikorian et al. | 342/160 |
| 5,650,738 | 7/1997 | Taylor et al. | 327/237 |
| 5,847,675 | 12/1998 | Poinsard | 342/81 |
| 5,917,442 | 6/1999 | Manoogian | 342/62 |

FOREIGN PATENT DOCUMENTS

| | | | |
|---|---|---|---|
| 3110324A | 11/1982 | Germany | G01S 13/52 |
| 3110279A | 1/1984 | Germany | G01S 13/52 |
| 3132268C | 12/1985 | Germany | G01S 7/28 |
| 06066930A | 3/1994 | Japan | G01S 13/30 |
| 08184665A | 7/1996 | Japan | G01S 7/295 |
| 174989B | 4/1984 | Netherlands | G01S 13/52 |
| 2002617A | 2/1979 | United Kingdom | G01S 7/28 |

*Primary Examiner*—John B. Sotomayor
*Attorney, Agent, or Firm*—Stout, Uxa, Buyan & Mullins, LLP; Donald E. Stout

[57] ABSTRACT

A process and a system for selecting a pulse repetition frequency that causes clutter pulse repetition frequency lines from the negative carrier frequency and from the clutter harmonic frequencies to lay on top of clutter pulse repetition frequency lines from the positive carrier frequency. A pulsed Doppler radar receiver of the system has one or more channels each comprising of a radio frequency input section for receiving a radio frequency carrier. Following the radio frequency input section are one or more serially arranged intermediate frequency sections that terminate in a last intermediate frequency section. The last intermediate frequency section is followed by analog-to-digital conversion and down-conversion to baseband in-phase and quadrature channels. In-phase and quadrature data from the in-phase and quadrature channels is processible by a computational system to detect and track a target in the presence of clutter. A pulse repetition frequency space is determined that consists of all pulse repetition frequencies equal to one or two times the intermediate frequency of the last intermediate frequency section divided by an integer. The computational system is then directed to choose a pulse repetition frequency from the pulse repetition frequency space to use in tracking the target. The system may be in a guided missile or other flying object.

19 Claims, 7 Drawing Sheets

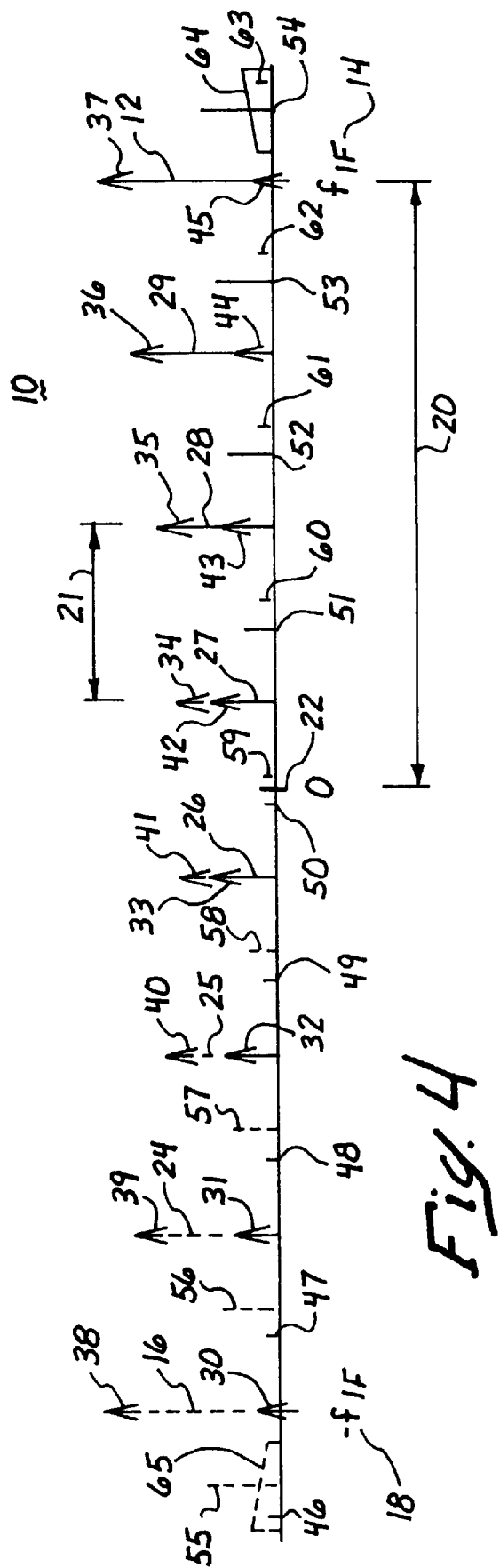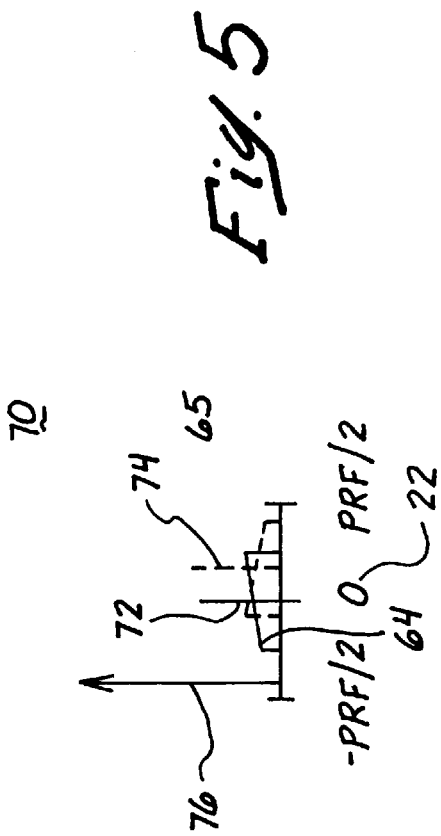
Fig. 4
Fig. 5

PULSED DOPPLER RADAR SYSTEM WITH SMALL INTERMEDIATE FREQUENCY FILTERS

BACKGROUND OF THE INVENTION

1. Field of the Invention

This invention relates to radar systems, and more specifically to search and tracking pulsed Doppler radar systems.

2. Description of the Related Art

A pulsed Doppler radar receiver must detect moving targets in the presence of ground and rain clutter. The radar return signals from moving targets are separated in frequency from the clutter returns. A pulse Doppler radar uses a coherent pulse train, i.e., a train of pulses that are samples of a single unmodulated sine wave, which is a carrier. Due to the pulsing of the carrier, the signal has a broad band line spectrum, where the lines are separated by the pulse repetition frequency (PRF). In the process of down-converting the signals from the radio frequency (RF) to intermediate frequencies (IF) and to baseband, the clutter PRF lines from the image of the passband may fall in the target frequency band and be falsely detected as targets, since the power reflected from clutter may be much greater than power reflected from the target.

It is common practice in the art to provide IF filters with sufficient image rejection to prevent the clutter image PRF lines from being detected as false targets. This causes the filters to be significantly larger, heavier, and more costly than if the filters were only required to reject the target image.

SUMMARY OF THE INVENTION

It is an object of the invention to provide smaller, lighter, and less costly IF filters for a pulsed Doppler radar which is especially important for a guided missile RF seeker.

Another object of the invention is to prevent clutter harmonic distortion PRF lines from falling in the target frequency band.

The foregoing and other objects of the invention are attained generally by using only PRFs which divide evenly (an integer quotient) into twice the IF. By using these PRFs, the clutter PRF lines from the image of the passband will fall outside the target band. Therefore, analog and digital filter stopband attenuation requirements are reduced because they are not driven by clutter power. This reduces the size, weight, and cost of the first and second IF bandpass filters (BPFs), the third IF lowpass filter (LPF), and the digital decimation filter following analog-to-digital conversion.

In an aspect of the invention, a process for selecting a pulse repetition frequency causes clutter pulse repetition frequency lines from the negative carrier frequency and from the clutter harmonic frequencies to lay on top of clutter pulse repetition frequency lines from the positive carrier frequency. The process comprises a first step of providing a pulsed Doppler radar receiver having one or more channels each comprising of a radio frequency input section for receiving a radio frequency carrier. Following the radio frequency input section are one or more serially arranged intermediate frequency sections that terminate in a last intermediate frequency section. The last intermediate frequency section is followed by analog-to-digital conversion and down-conversion to baseband in-phase and quadrature channels. In-phase and quadrature data from the in-phase and quadrature channels is processible by a computational system to detect and track a target in the presence of clutter.

In the next step of the process, a pulse repetition frequency space is determined that consists of all pulse repetition frequencies equal to one or two times an intermediate frequency of the last intermediate frequency section divided by an integer. In another step of the process, a pulse repetition frequency is chosen from the pulse repetition frequency space.

In a further aspect of the invention, the choosing the pulse repetition frequency step comprises the step of using a software waveform control algorithm to select the pulse repetition frequency from the pulse repetition frequency space.

In a further aspect of the invention, the process has an additional step of receiving into the radio frequency input section a radio frequency carrier which is pulsed at the pulse repetition frequency. In a still further aspect of the invention, the radio frequency carrier is generated by a Doppler estimating system that estimates the radio frequency carrier based on signals received from the target by the pulsed Doppler radar receiver.

In a further aspect of the invention, the providing step further comprises the step of providing a flying object with the pulsed Doppler radar receiver installed therein. In a still further aspect of the invention, the flying object is a guided missile.

In a further aspect of the invention, the computational system comprises a digital processor.

In an aspect of the invention, a process for tracking a target comprises similar steps as the above aspect of the invention that is a process for selecting a pulse repetition frequency.

In an aspect of the invention, a pulsed Doppler radar receiver system comprises one or more channels, a computational system, and a first set of instructions. Each of the channels comprises a radio frequency input section followed by one or more serially arranged intermediate frequency sections that terminates in a last intermediate frequency section, followed by analog-to-digital conversion and down-conversion to baseband in-phase and quadrature channels. The computational system receives and performs computations of in-phase and quadrature data from the in-phase and quadrature channels. The first set of instructions, readable by the computational system, directs the computational system to calculate a pulse repetition frequency space that consists of all pulse repetition frequencies equal to one or two times the intermediate frequency of the last intermediate frequency section divided by an integer.

In a further aspect of the invention, there is a second set of instructions, readable by the computational system, that directs the computational system to choose a pulse repetition frequency from the pulse repetition frequency space. In a still further aspect of the invention, there is a third set of instructions, readable by the computational system, that directs the computational system to estimate a radio frequency carrier based on signals received from a target by the pulsed Doppler radar receiver system.

In a further aspect of the invention, the pulsed Doppler radar receiver system a component of an object capable of flight. In a still further aspect of the invention, the pulsed Doppler radar receiver system a component of a guided missile.

BRIEF DESCRIPTION OF THE DRAWINGS

FIG. 4 shows a frequency spectrum having clutter centered at the IF according to an embodiment of the invention;

FIG. 5 shows the frequency spectrum of FIG. 4 shifted to base band (i.e. shifted to direct current) and folded;

DESCRIPTION OF THE PREFERRED EMBODIMENTS

Figure 1:
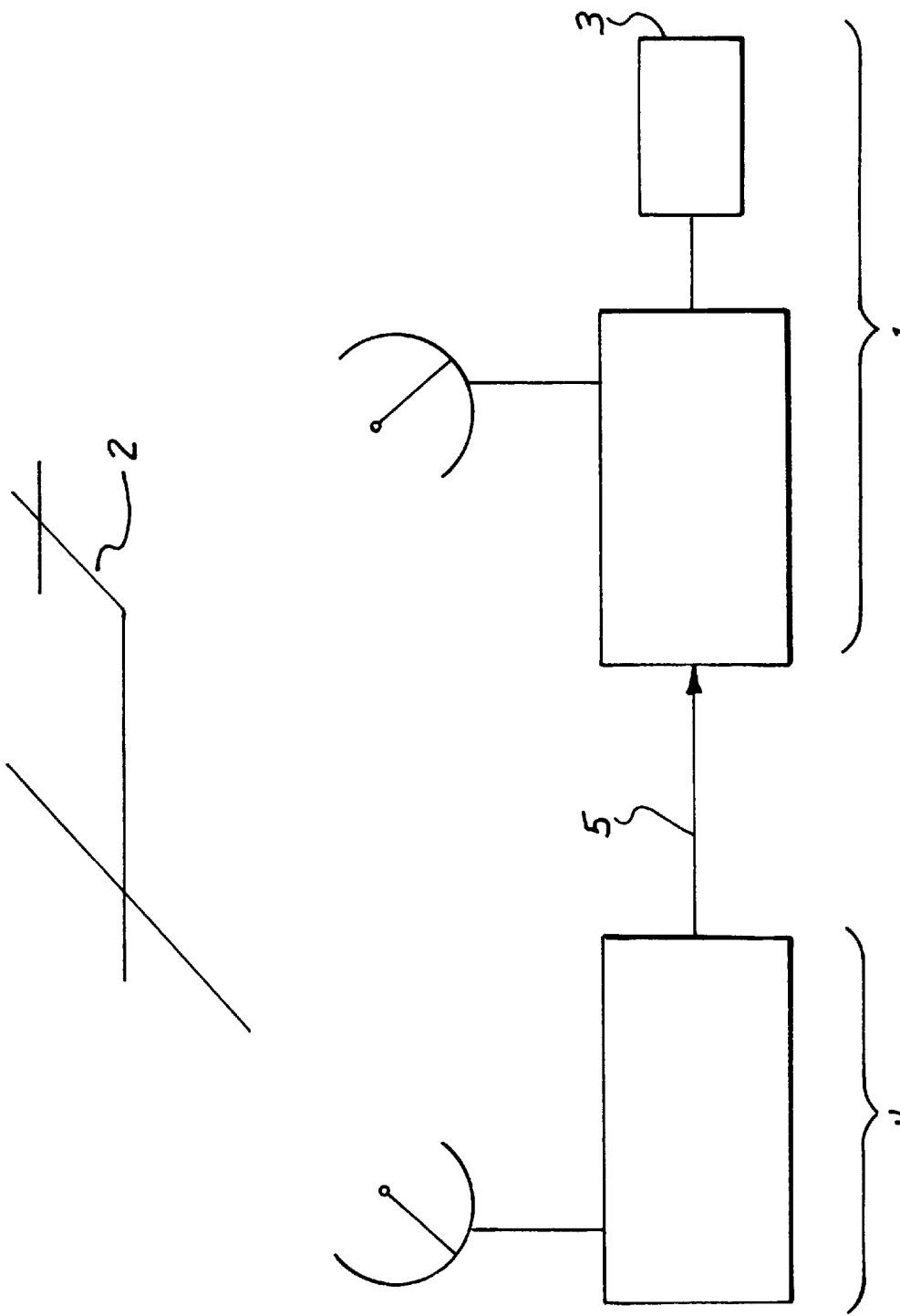
FIG. 1 shows a radar system according to an embodiment of the invention.

Referring now to FIG. 1, a first radar system 1 sends signals to a target 2 and receives signals bounced off of the target. The radar system has an IF processor 3 that has one or more intermediate frequencies ("IF"). The radar system 1 has means for choosing a pulse repetition frequency ("PRF") for the signals that is equal to one or two times the last intermediate frequency divided by an integer.

In the shown embodiment of the invention, the radar system 1 has a means for receiving an estimate of the Doppler frequency of the target 1 from a second radar system 4. The IF processor 3 of the radar system 1 sends out a video signal that is processed by a digital processor to measure range, range rate, and angle to the target. Other embodiments of the invention may use any computational system to process any signals of the embodiment of the invention or perform any computations based on algorithms. The means for receiving the Doppler frequency estimate includes a signal transfer device 5 between the second and first radar systems 4 and 1. Other embodiments of the invention may estimate the Doppler frequency from processing the signals received from the target by the first radar system 1. Other embodiments of the invention may have other means for estimating target distance and inputting into radar system 1.

By using the invention, a radar engineer chooses an IF frequency plan for a radar receiver related to the PRF (pulse repetition frequency) space in such a way that clutter PRF lines from the negative carrier frequency lay on top of the clutter PRF lines from the positive carrier frequency. This is to keep the clutter PRF lines outside the target band which prevents clutter from being detected as a false target. This is possible because the Doppler frequency shift of clutter is less than that of a moving target, such as an airplane or missile.

The PRF space consists of the pulse repetition frequencies from which the software waveform control algorithm may choose one PRF at a time. The criteria for selecting a PRF depends on the application. For a radar seeker on a guided missile, the essential criteria is to choose a waveform that places the target return clear of the transmit pulse and clear of the clutter return in Doppler frequency. Since a guided missile is closing rapidly on a target, the PRF must be changed several times per second to keep the target return clear in range, while simultaneously keeping the target clear in Doppler.

Figure 9:
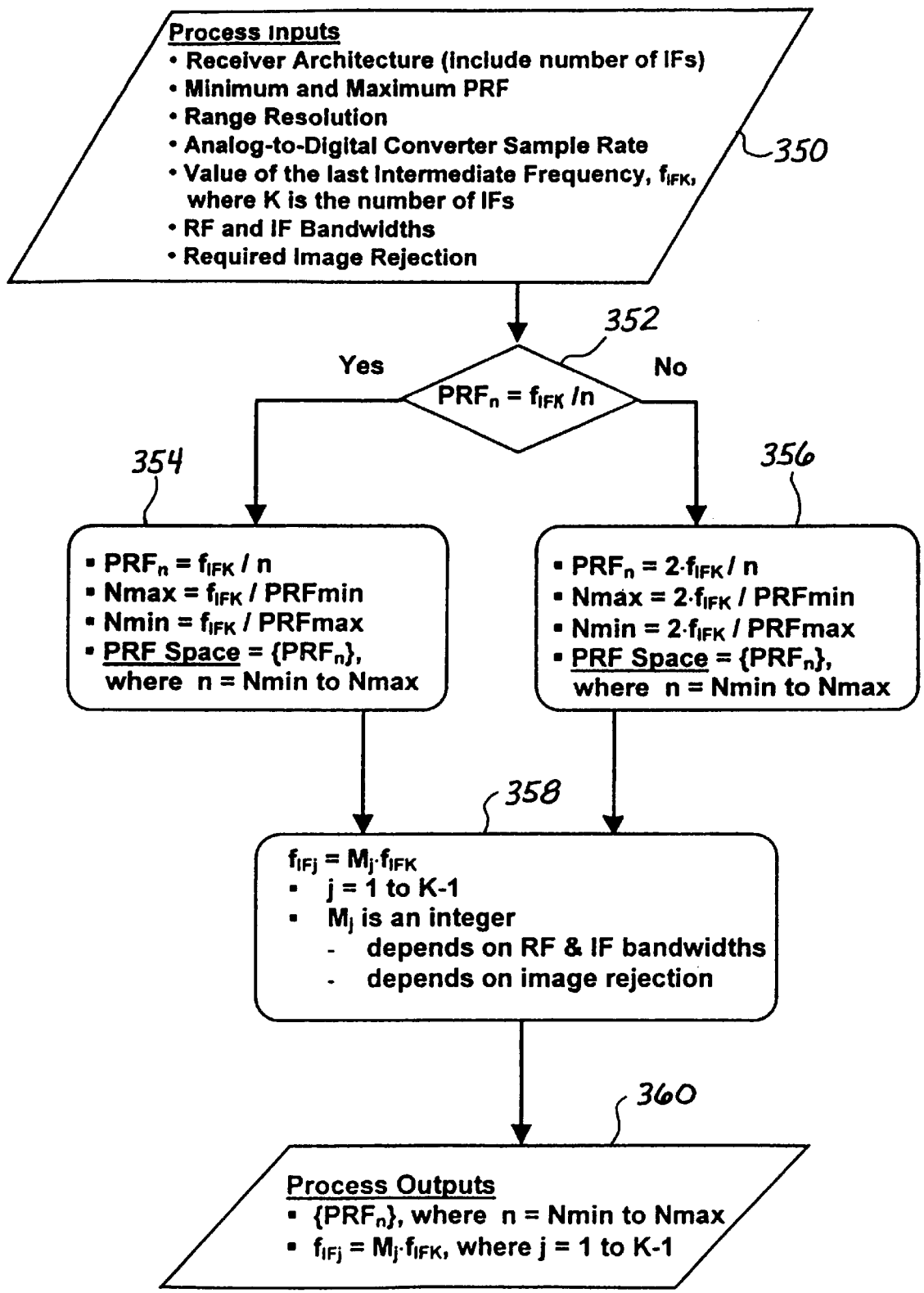
FIG. 9 shows a flow diagram for selecting an IF processor frequency plan to avoid main lobe clutter according to an embodiment of the invention.

Referring now to FIG. 9, a flow diagram for selecting an IF processor frequency plan to avoid main lobe clutter according to an embodiment of the invention begins at step 350 for choosing process inputs. These process inputs may include information on the receiver architecture, including the number of IFs, the minimum and maximum PRF, the desired range resolution, the analog-to-digital converter sample rate, the value of the last intermediate frequency, $f_{IFK}$, the RF and IF bandwidths, and the required image rejection. In the flowchart, it is assumed that K=3, but other embodiments of the invention may have K equal an integer. In an embodiment of the invention, the $f_{IFK}$ is equal to fs/4, where fs is the frequency of a digital to analog converter used in radar receiver system according to an embodiment of the invention.

In the next step 352, a decision is made as to whether $PRFF_n=f_{IF3}/n$. If yes, then the process continues to step 354 where $PRF_n=f_{IFK}/n$; $Nmax=f_{IFK}/PRFmin$; $Nmin=f_{IFK}/PRFmax$; and the PRF space=the set of $PRF_n$, where n=Nmin to Nmax. If no, then the process continues to step 356 where $PRF_n=2 \cdot f_{IFK}/n$; $Nmax=2 \cdot f_{IFK}/PRFmin$; $Nmin=2 \cdot f_{IFK}/PRFmax$; and the PRF space=the set of $PRF_n$, where n=Nmin to Nmax.

After either step 354 or 356, the process continues to step 358 in which the remaining IFs are chosen as a function of $f_{IFK}$. $f_{IFj}=M_j \cdot f_{IFK}$, where j=1 to K−1, $M_j$ is an integer that depends on the RF & IF bandwidths and depends on the image rejection. Then the process produces output 360 of the set of $PRF_n$ and $f_{IFj}$ at step 360. These outputs are used by the radar subsystem designers and waveform control designers.

The set of IF frequencies $f_{IFj}$, where j=1 to K, have fixed values which are requirements placed on the IF processor and the exciter, which generates the first, second, and third local oscillator signals to be input to the IF processor. The exciter must be able to generate any one of the PRFs in the set of $PRF_n$ upon command from the digital processor. When the radar system operates, it selects a PRF from the set of $PRF_n$ to detect and track objects.

The equipment used in embodiments of the invention is not new. Rather, by using $f_{IFK}=N*PRF/2$ or $f_{IFK}=N*PRF$ and $f_{IFj}=M_j \cdot f_{IFK}$ to set a PRF that is an integer submultiple of the $f_{IF1}$ through $f_{IFK}$ where K is the number of IF's, components of the radar system according to the invention, and the overall radar system, are smaller, lighter, and less costly than those disclosed in the prior art with comparable clutter located in the target bands. The invention is well suited for applications requiring IF processors with those characteristics, such as guidance systems in missiles and radar systems on ground, ships, and airborne platforms.

Below are two examples of the process of selecting IFs related to PRF space. In the first example, the system has three IF filters and an analog to digital converter with a sample rate of fs which is 400 kHz. The system has a minimum PRF of 0.5 kHz and a maximum PRF of 5 kHz. The range resolution is 0.05 milliseconds, which is a fraction of the minimum PRI, which equals 0.2 millisecond. The fs value is chosen to have an integer number, 20, of samples per range resolution cell as 400*0.05=20. $f_{IF3}$, which is the $F_{IFK}$, is chosen to equal fs/4 to simplify a fourth LO input to be a sequence of plus and minus ones. Therefore $f_{IF3}$ is 100 kHz. Choosing $PRF_n$ to equal $2*f_{IF3}/n$, $Nmax=2*f_{IF3}/PRFmin=200/0.5=400$ and $Nmin=2*f_{IF3}/PRFmax=200/5=40$. Therefore the PRF space is Nmax−Nmin+1=361 different PRFs. In completing step 358 to determine $f_{Ifj}=M_j* f_{IFK}$, the first step is to determine $f_{IF2}$. The value chosen for $M_2$ is dependent in part on the bandwidth of the second IF filter, which is at least 1/(Range Resolution) or 20 kHz in this example. As the minimum bandwidth to carrier frequency for a bandpass filter is 1%, the maximum value of $f_{IF2}$ is 2000 kHz and the maximum value of $M_2$ is 20. To determine $F_{IF1}$, one looks at the RF bandwidth and the image separation desired. For this example, $M_1$ could be in the range of 200 to 2000.

In another example of applying the process of FIG. 9, the system is the same as in the previous example, but with $PRF_n$ being equal to $f_{IF3}/n$. Using this equation results in $Nmax=f_{IF3}/PRFmin=100/0.5=200$ and $Nmin=f_{IF3}/PRFmax=100/5=20$. It follows that the PRF space in the second example results in a PRF space of 181 PRFs. The determination of $M_i$s is the same as in the first example.

In general, the second example is preferred over the first example. In the system of the second example filter, the stopband attenuation requirements do not need to take into account even harmonics of clutter due to component non-linearities. However, this is balanced against the PRF space of the first example being twice as big as the PRF space in the second example, resulting in potentially better performance. The PRF space could also be increased by increasing the sample rate of the analog to digital converter.

Figure 2:
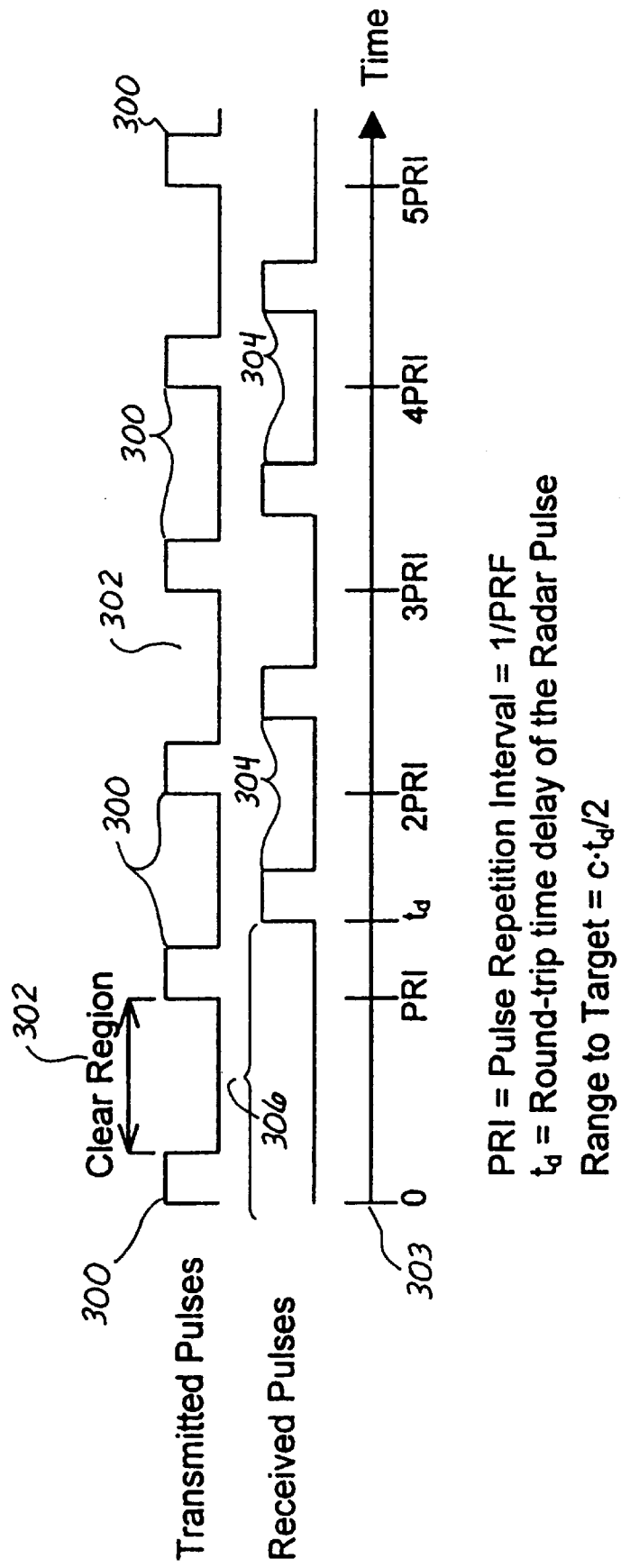
FIG. 2 shows the received pulses clear of the transmitted pulses according to an embodiment of the invention.

Referring now to FIG. 2, the transmitted pulses 300 from a radar system designed with the IF frequency plan as described below are shown with clear regions 302 therebetween. The transmitted pulses 300 occur once every PRI or pulse repetition interval, which is equivalent to 1/PRF, as is shown on the time line 303. The received pulses 304 occur with the same frequency as the transmitted pulses, with a round trip time delay 306. The wave form has been chosen to place the received pulses 304 clear of the transmitted pulses 300.

Figure 3:
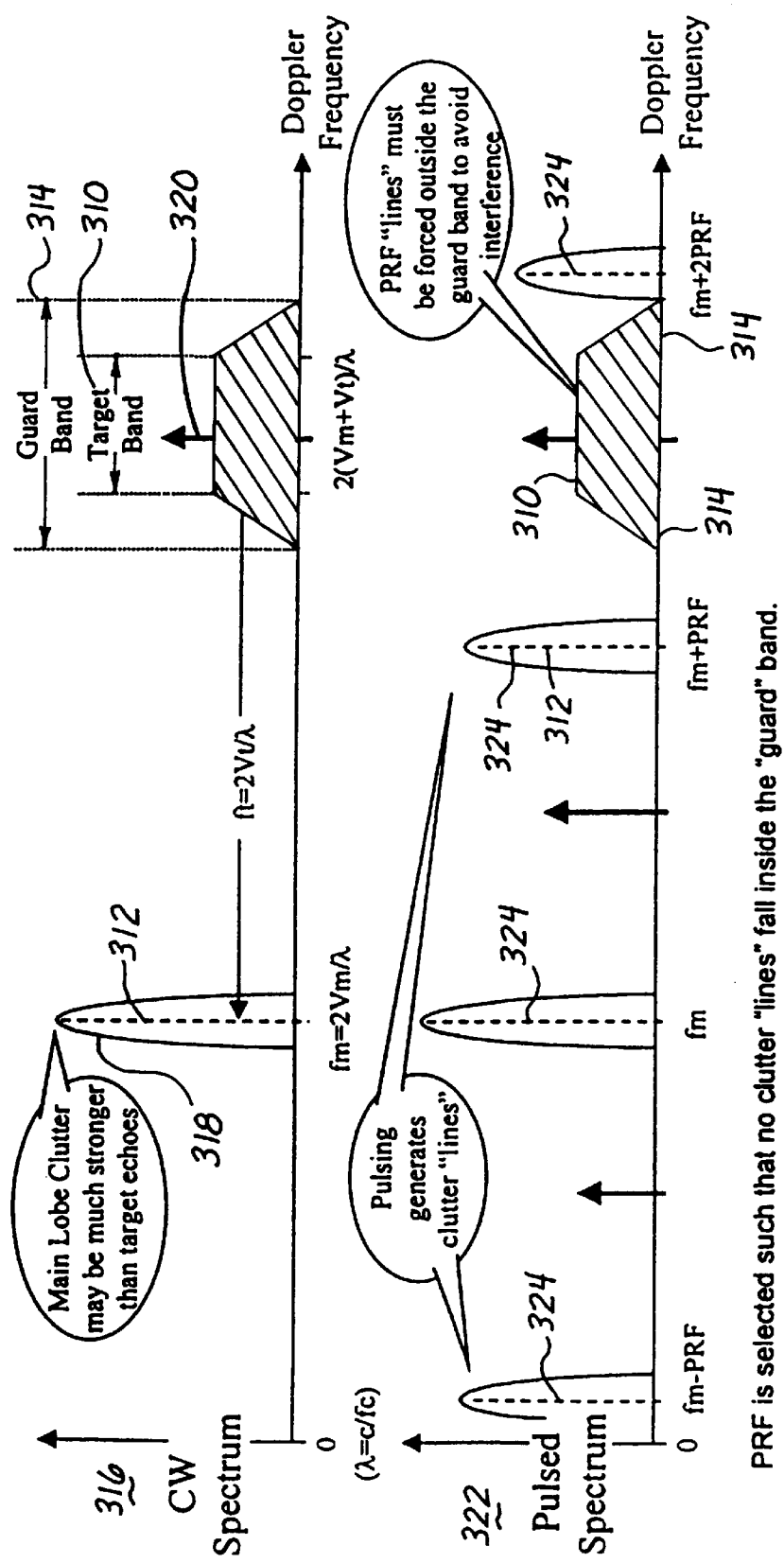
FIG. 3 shows continuous wave and pulsed spectrums according to an embodiment of the invention.

Referring now to FIG. 3, the target frequency band 310 accounts for the uncertainty in the target Doppler frequency before the seeker has detected the target. The target band 310 covers the uncertainty in the ground radar's measurement of the missile-to-target range rate. The missile-to-target range rate is the combined velocities of the missile and the target in the line-of-sight from the missile to the target. A software waveform control algorithm selects a PRF from the PRF space such that the clutter PRF lines 312 are forced outside of the target band 310, and more preferably outside a guard band 314.

The continuous wave spectrum 316 shows a main lobe clutter 318 at fm=2 Vm/, where Vm is the missile velocity in the line of sight, and λ is the RF carrier wavelength. The target Doppler frequency is 2(Vm+Vt)/λ, where Vt is the target velocity in the line of sight. The power received from the target is represented by line 320 which is located in the target band 310. This distance between the main lobe clutter 318 and the target line 320 is ft=2Vt/λ.

The pulsed spectrum 322 shows pulse generated clutter lines 324 that occur at PRF intervals from fin. A software waveform control algorithm forces the pulse generated clutter lines 324 outside the guard band 314 to avoid interference.

Referring now to FIG. 4, an embodiment of the invention is discussed in more detail. A frequency spectrum 10 shows a main clutter line 12 at the positive intermediate frequency ("$f_{IF}$") 14, which is shown to the right on the spectrum. A main clutter line 16 occurs at the negative intermediate frequency ("$-f_{IF}$") 18, which is shown to the left on the spectrum. A zero midpoint 22 lies between $f_{IF}$ 14 and $-f_{IF}$ 18.

In the discussed embodiment, the main clutter lines 12 and 16 occur at $f_{IF}$ 14 and $-f_{IF}$ 18 as a result of the target's Doppler frequency being known to the radar from the radar's velocity and from clutter return measurements. The transmitter RF carrier is adjusted to place the clutter radar return at $f_{IF}$. The target uncertainity band being known from another radar is less than the pulse repetition frequency ("PRF") 21. In the shown embodiment, the IF frequency 20 is an integer multiple of half of the PRF. As N equals seven in the frequency spectrum 10, the $f_{IFK}$ 14 is three and a half times the PRF 21.

Having $f_{IFK}$=N*PRF/2 has a number of benefits. First, the clutter PRF lines from the negative of the last IF do not appear in the target bands, where they could be mistaken for a target, as discussed in detail below. Second, all odd harmonic clutter PRF lines, which are generated by component non-linearities in the last IF, lay on top of fundamental PRF lines, therefore they do not appear in target bands. If $f_{IFK}$=N*PRF, a third benefit is observed as all even harmonic clutter PRF lines lay on top of fundamental PRF lines. This increases the allowable distortion in the last mixer and analog-to-digital converter, as discussed below.

Continuing to referring to FIG. 4, six clutter lines 24–29 occur, shown left to right, between the main clutter lines 16 and 12. The clutter lines 16, 24–29, and 12 are composed of a positive frequency clutter lines 30–37, respectively, and a negative frequency clutter lines 38–45, respectively. The positive frequency clutter lines 30–37 are represented by solid lines and the negative frequency clutter lines 38–45 are represented by dashed lines. The positive frequency clutter lines 30–37 and the negative frequency clutter lines 38–45 overlap each other, respectively. The heights of the clutter lines, indicated by the arrow heads, represent amplitude. The amplitudes of the clutter lines 30–45 drop the further away from its respective carrier. As a result, the negative frequency clutter line 38 at main clutter line 16 has the highest amplitude and the negative frequency clutter line 45 at main clutter line 12 has the lowest amplitude. Similarly, the positive frequency clutter line 30 at main clutter line 16 has the lowest amplitude and the positive frequency clutter line 37 at main clutter line 12 has the highest amplitude.

The frequency spectrum 10 also shows positive frequency target receive signals 46–54, left to right, and negative frequency target receive signals 55–63, right to left also. The amplitudes of the signals 46–63 are also a function of the distance from the carrier, as with the clutters 30–45. The amplitudes of the signals 46–63 are much lower than the amplitudes of the clutter signals 30–45.

The frequency spectrum 10 also shows a positive target band 64 on the right side and a negative target band 65 on the left side. The target bands 64 and 65 represent the uncertainty of a target frequency. An estimate of the target frequency is obtained from another radar in the form of a Doppler frequency shift of the target. As the positive and negative frequency clutters 30–45 overlap, the space between the clutters is available to determine the target frequency. If the clutters 30–45 did not overlap, some clutter would appear in the bands 64 and 65 and obscure the much lower amplitude target signals 46–63.

Referring now to FIG. 5, a folded frequency spectrum 70 shows the frequency spectrum 10 shifted to base band (i.e. shifted to direct current) and folded. In the preferred embodiment of the invention, the shift to base band is accomplished digitally with two multipliers (not shown). Other embodiments of the invention may use analog mixers (not shown) to accomplish the shift. Still further embodiments of the invention may use a cpu or other computational system (not shown). The folding of the spectrum 10 results in the positive target signals 46–54 combining into a combined positive target signal 72 and the negative target signals 55–63 combining into a combined negative target signal 74. Any number of PRF intervals may be folded, but a practical limit exists due to signal attenuation. Both the combined target signals 72 and 74 remain in their respective target bands 64 and 65. The folding of the spectrum 10 also results in the clutters 16, 24–29, and 12 forming a combined clutter 76. The combined clutter 76 does not fall into either the target bands 64 and 65, resulting in the combined target signals 72 and 74 not being obscured by the clutter.

Figure 6:
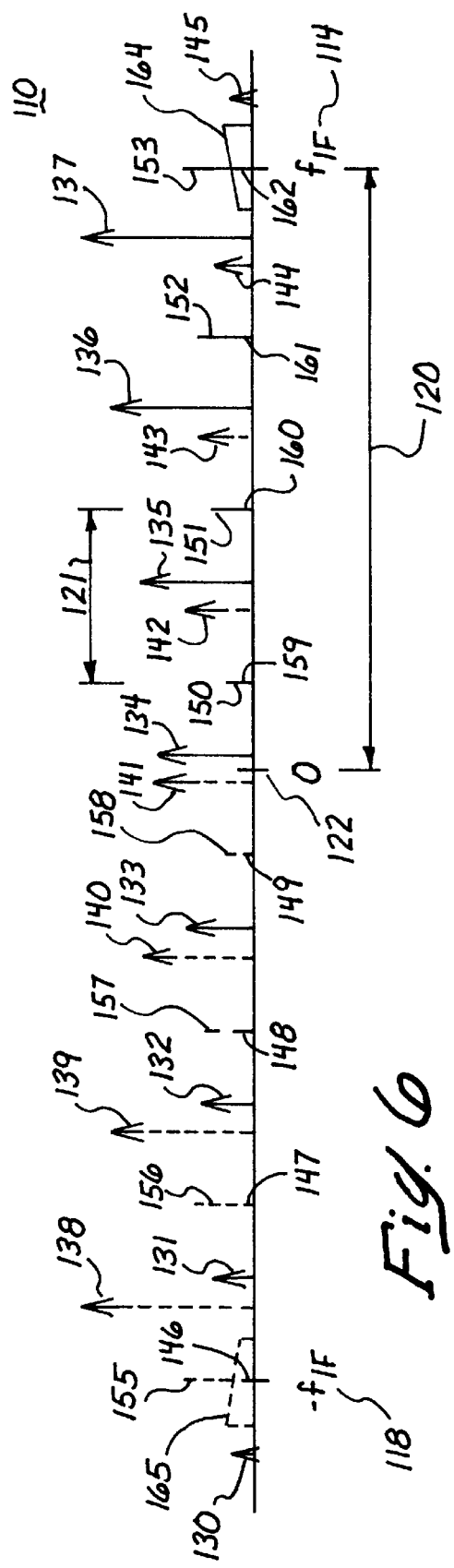
FIG. 6 shows a frequency spectrum having targets centered at the IF according to an embodiment of the invention.

Referring now to FIG. 6, a frequency spectrum 110, wherein referenced elements in spectrum 110 are comparable to referenced elements in spectrum 10 increased by 100, shows the positive frequency target signals 146–153 and the negative frequency target signals 155–162 overlapping, respectively, at the center of the IF. Further, the positive frequency clutters 130–137 do not overlap the negative frequency clutters 138–145. This contrasts to spectrum 10 where the clutters 30–34 overlapped at the center of the IF and the target signals did not overlap. It remains the same that the targets bands 164 and 165 are clear of clutter.

Figure 7:
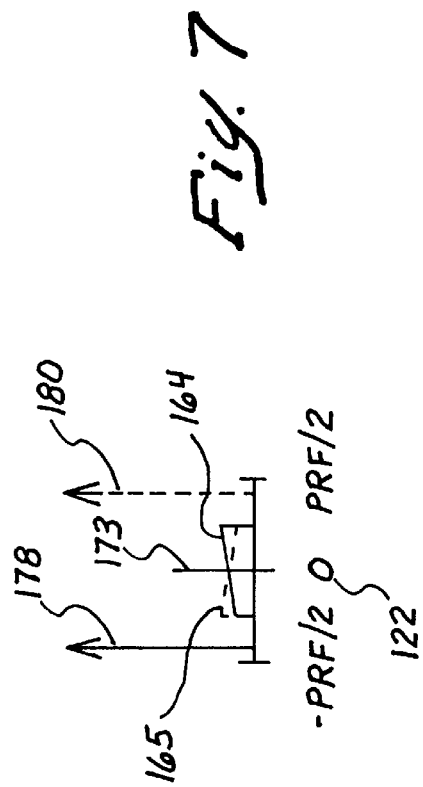
FIG. 7 shows the frequency spectrum of FIG. 6 shifted to base band (i.e. shifted to direct current) and folded.

Referring now to FIG. 7, a folded frequency spectrum 170, wherein referenced elements in spectrum 170 are comparable to referenced elements in spectrum 70 by increasing the reference number by 100, shows the frequency spectrum 110 shifted to base band (i.e. shifted to direct current) and folded. The base band shifting and folding steps are performed in a similar manner as described in connection with the folded frequency spectrum 70. However, the folding results in the target bands 164 and 165 overlapping and the target signals 146–153 and 155–162 overlapping to form a combined target signal 173 that is positioned on the zero midpoint 122. The positive frequency clutters 130–137 combine during folding to a positive frequency combined clutter 178 to the left of the target bands 164–165. The negative frequency clutters 138–145 combine during folding to a negative frequency combined clutter 180 to the right of the target bands 164–165. The combined clutters 178 and 180 do not fall in the target bands 164–165, thus enabling clear determination of the combined target signal 173.

Figure 8:
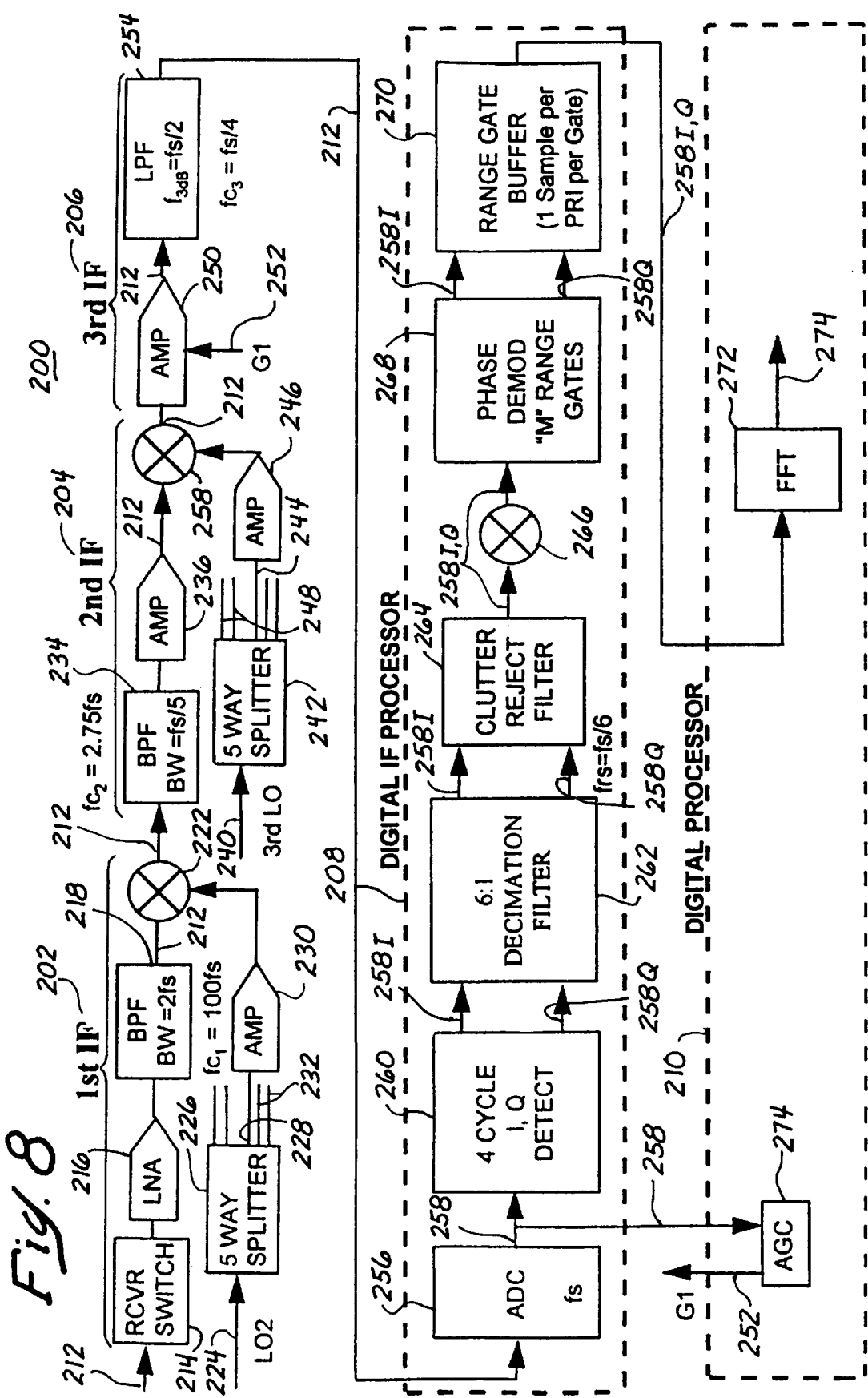
FIG. 8 shows a schematic diagram of a single channel of a multichannel radar receiver system according to an embodiment of the invention.

Referring to FIG. 8, in a preferred embodiment of the invention, a radar IF processor channel 200 for performing the steps required to obtain target data comprises a first IF 202, a second IF 204, a third IF 206, a digital IF processor 208, and a digital processor 210. A signal 212 from an antenna, RF amplifier, and a first mixer (not shown) is received by a receiver switch 214 in the first IF 202 and moves through a low noise amplifier 216 and a band pass filter 218. The band pass filter 218 has a band width that is twice the sampling frequency of an analog to digital converter ("ADC") 256 in the digital IF processor 208. The signal 212 is then received by mixer 222. The mixer 222 may be an analog mixer or a down converter. A local oscillator number 2 signal 224 is directed to a five way splitter 226. An exiting splitter signal 228 is received by an amp 230 and directed to the mixer 220, where it combines with signal 212. The remainder of the exiting signals 232 are directed to other IF processor channels (not shown). Other embodiments of the invention may have more or less than four other IF processor channels.

After the first IF 202, the signal 212 enters a band pass filter 234 of the second IF 204 to further narrow the signal band width. Specifically, the band width is reduced to one fifth the sampling frequency of the ADC 256. The signal passes through amplifier 236 and into mixer 238. A third local oscillator number 3 signal 240 is directed to a five way splitter 242. An exiting splitter signal 244 is received by an amp 246 and directed to the mixer 238, where it combines with signal 212. The remainder of the exiting signals 248 are directed to other IF processor channels (not shown). The signal at the output of mixer 238 is centered at the ADC sample frequency divided by four, which is the third intermediate frequency.

After exiting the mixer 238, the signal 212 enters an amplifier 250 of the third IF 206. The amplifier 250 also receives a G1 signal 252 from an automatic gain control 274 in the digital processor 210 to adjust the amplification. The signal 212 is then received by a low pass filter 254 that attenuates the signal 3dB at frequency=$f_s/2$, where $f_s$ is the ADC sampling frequency. The low pass filter 254 attenuates the sum frequency signals from mixer 238 output. The sample frequency is set at the ADC 256.

The shown embodiment of the invention has three IFs. Other embodiments of the invention may have more or less IFs.

After exiting the third IF 206, signal 212 enters the ADC 256 of the digital IF Processor 208. The signal 212 is converted from analog to a digital signal 258 in the ADC 256. The ADC 256 has a sample frequency that could be many megahertz. The signal 258 is also sent to the automatic gain control 274 to generate the G1 signal 252.

The digital signal 258 is received by a four cycle I, Q detector 260 that converts the signal center frequency from the frequency sample divided by four down to zero. Other embodiments of the invention may have detectors of other cycles. The detector 260 generates an in-phase signal 258I and a quadrature phase signal 258Q. The signals 258I and 258Q are received by a 6:1 decimation filter 262 that reduces the sample rate by six. Other embodiments of the invention may reduce the sample rate by other amounts.

After the filter 262, the signals 258I and 258Q are received by a clutter reject filter 264. Other embodiments of the invention may place the filter 264 at other suitable locations within the system 200. Next, the target signals 258I and 258Q are shifted to direct current in the mixer 266. Embodiments of the invention, particularly those with the target at the center of the IF, may not have the mixer 266. The signals 258I and 258Q are received by a phase demodulator 268 and a range gate buffer 270. The range gate buffer 270 permits one sample per pulse repetition interval per gate. The reduction of the sample rate to the PRF causes the folding of the frequency spectrum, as described above.

After exiting the digital IF processor 208, the signals 258I and 258 enter the fast Fourier transform 272 for parsing. The parsed signal 274 is processed to detect and track targets and to measure the range, range rate, and angle for each target in the track file. These measurements are sent from the digital processor to a guidance processor on board the missile, which uses the measurements to guide the missile to a target. The digital processor also has the automatic gain control 274 for setting the G1 signal 252.

Referring now to FIG. 9, a flow diagram for selecting an IF processor frequency plan to avoid main lobe clutter according to an embodiment of the invention begins at step 350 for choosing process inputs. These process inputs may include information on the receiver architecture, including the number of IFs, the minimum and maximum PRF, the desired range resolution, the analog-to-digital converter sample rate, the value of the last intermediate frequency, $f_{IFK}$, the RF and IF bandwidths, and the required image rejection.

In the next step 352, a decision is made as to whether $PRF_n = f_{IFK}/n$. If yes, then the process continues to step 354 where $PRF_n = f_{IFK}/n$; $Nmax = f_{IFK}/PRFmin$; $Nmin = f_{IFK}/PRFmax$; and the PRF space=the set of $PRF_n$, where n=Nmin to Nmax. If no, then the process continues to step 356 where $PRF_n = 2 \cdot f_{IFK}/n$; $Nmax = 2 \cdot f_{IFK}/PRFmin$; $Nmin = 2 \cdot f_{IFK}/PRFmax$; and the PRF space=the set of $PRF_n$, where n=Nmin to Nmax.

After either step 354 or 356, the process continues to step 358, where $f_{IFj} = M_j \cdot f_{IFK}$, where j=1 to K−1, $M_j$ is an integer that depends on the RF & IF bandwidths and depends on the image rejection. Then the process produces output 360 of the set of $PRF_n$ and $f_{IFj}$. These outputs are used by the radar subsystem designers and waveform control designers.

The set of IF frequencies $f_{IFj}$, where j=1 to K, have fixed values which are requirements placed on the IF processor and the exciter, which generates the first, second, and third local oscillator signals to be input to the IF processor. The exciter must be able to generate any one of the PRFs in the set of $PRF_n$ upon command from the digital processor. When the radar system operates, it selects a PRF from the set of $PRF_n$ to detect and track objects.

The equipment used in embodiments of the invention is not new. Rather, by using $f_{IK} = N*PRF/2$ or $f_{IFK} = N*PRF$ and $f_{IFj} = M_j \cdot f_{IFK}$ to set a PRF that is an integer submultiple of the $f_{IF1}$ through $f_{IFK}$ where K is the number of IF's, components of the radar system according to the invention, and the overall radar system, is smaller, lighter, and less costly than those disclosed in the prior art with comparable clutter located in the target bands. The invention is well suited for applications requiring IF processors with those characteristics, such as guidance systems in missiles and radar systems on ground, ships, and airborne platforms.

Although presently preferred embodiments of the present invention have been described in detail herein above, it should be clearly understood that many variations and/or modifications of the basic inventive concepts herein taught, which may appear to those skilled in the pertinent art, will still fall within the spirit and scope of the present invention, as defined in the appended claims.

I claim:

1. A process for selecting a pulse repetition frequency which causes clutter pulse repetition frequency lines from the negative carrier frequency and from the clutter harmonic frequencies to lay on top of clutter pulse repetition frequency lines from the positive carrier frequency, the process comprising the steps of:

a. providing a pulsed Doppler radar receiver having one or more channels each comprising of a radio frequency input section for receiving a radio frequency carrier, followed by one or more serially arranged intermediate frequency sections that terminate in a last intermediate frequency section, followed by analog-to-digital conversion and down-conversion to baseband in-phase and quadrature channels, wherein in-phase and quadrature data from the in-phase and quadrature channels is processible by a computational system to detect and track a target in the presence of clutter;

b. determining a pulse repetition frequency space that consists of all pulse repetition frequencies equal to one or two times an intermediate frequency of the last intermediate frequency section divided by an integer; and c. choosing a pulse repetition frequency from the pulse repetition frequency space.

2. The process of claim 1, wherein the choosing the pulse repetition frequency step comprises the step of using a software waveform control algorithm to select the pulse repetition frequency from the pulse repetition frequency space.

3. The process of claim 1, further comprising the step of receiving into the radio frequency input section a radio frequency carrier which is pulsed at the pulse repetition frequency.

4. The process of claim 3, wherein the radio frequency carrier is generated by a Doppler estimating system that estimates the radio frequency carrier based on signals received from the target by the pulsed Doppler radar receiver.

5. The process of claim 1, wherein the providing step further comprises the step of providing a flying object with the pulsed Doppler radar receiver installed therein.

6. The process of claim 5, wherein the flying object is a guided missile.

7. The process of claim 1, wherein the computational system comprises a digital processor.

8. A process for tracking a target comprising the steps of:

a. providing a pulsed Doppler radar receiver having one or more channels each comprising of a radio frequency input section followed by one or more serially arranged intermediate frequency sections that terminates in a last intermediate frequency section, followed by analog-to-digital conversion and down-conversion to baseband in-phase and quadrature channels, wherein in-phase and quadrature data from the in-phase and quadrature channels is processible by a digital processor to detect and track one or more targets in the presence of clutter;

b. determining a pulse repetition frequency space that consists of all pulse repetition frequencies equal to one or two times an intermediate frequency of the last intermediate frequency section divided by an integer; and c. choosing a pulse repetition frequency from the pulse repetition frequency space.

9. The process of claim 8, wherein the choosing the pulse repetition frequency step comprises the step of using a software waveform control algorithm to select the pulse repetition frequency from the pulse repetition frequency space.

10. The process of claim 8, further comprising the step of receiving a radio frequency carrier into the radio frequency input section.

11. The process of claim 10, wherein the radio frequency carrier is generated by a Doppler estimating system that estimates the radio frequency carrier based on signals received from the target by the pulsed Doppler radar receiver.

12. The process of claim 8, wherein the providing step further comprises the step of providing a flying object with the pulsed Doppler radar receiver installed therein.

13. The process of claim 12, wherein the flying object is a guided missile.

14. The process of claim 8, wherein the computational system comprises a digital processor.

15. A pulsed Doppler radar receiver system comprising:

a. one or more channels, each channel comprising of a radio frequency input section followed by one or more serially arranged intermediate frequency sections that terminates in a last intermediate frequency section, followed by analog-to-digital conversion and down-conversion to baseband in-phase and quadrature channels;

b. a computational system for receiving and performing computations on in-phase and quadrature data from the in-phase and quadrature channels; and c. a first set of instructions, readable by the computational system, for calculating a pulse repetition frequency space that consists of all pulse repetition frequencies equal to one or two times an intermediate frequency of the last intermediate frequency section divided by an integer.

16. The system of claim 15, further comprising a second set of instructions, readable by the computational system, that chooses a pulse repetition frequency from the pulse repetition frequency space.

17. The system of claim 15, further comprising a third set of instructions, readable by the computational system, that estimates a radio frequency carrier based on signals received from a target by the pulsed Doppler radar receiver system.

18. The system of claim 15, wherein the Doppler radar receiver system is a component of an object capable of flight.

19. The system of claim 15, wherein the Doppler radar receiver system is a component of a guided missile.

* * * * *